United States Patent Office 3,093,690
Patented June 11, 1963

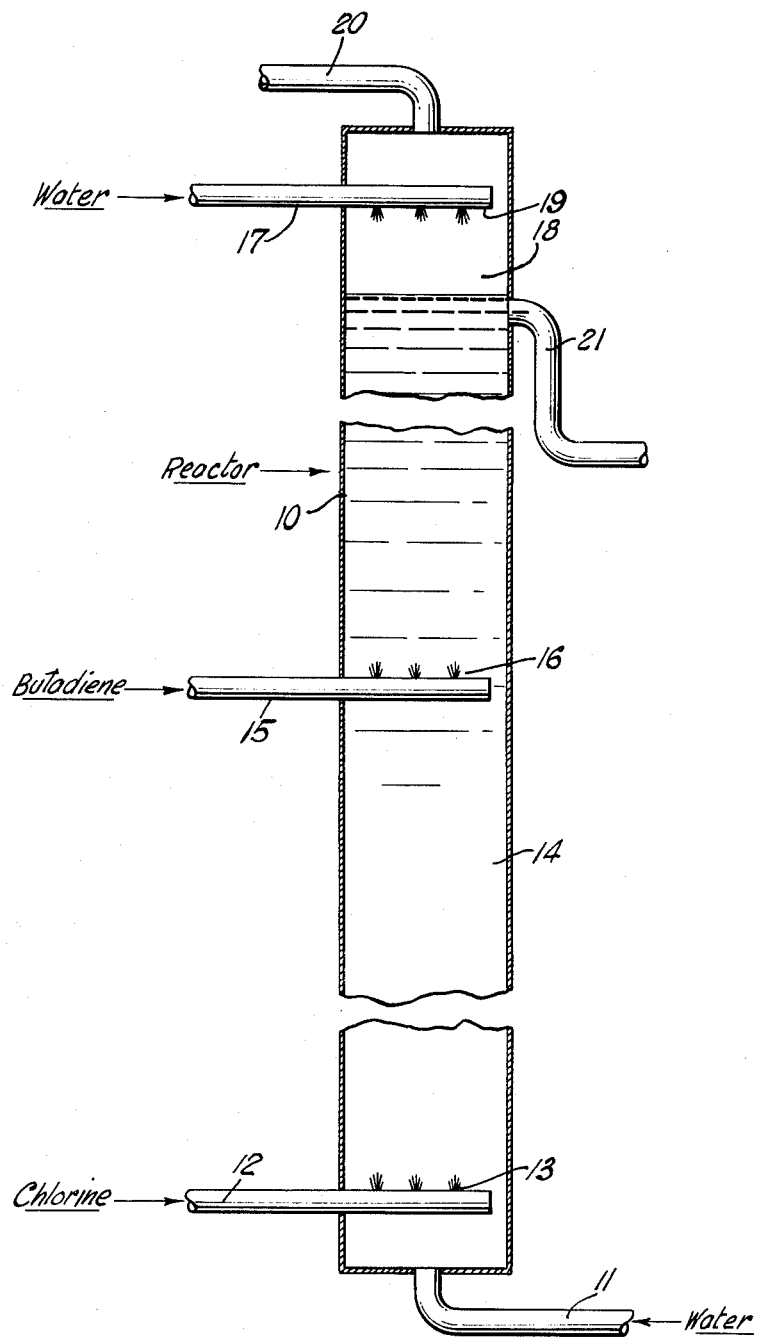

3,093,690
METHOD FOR PREPARING BUTADIENE DICHLOROHYDRINS
Philip H. Moss, Austin, Tex., assignor to Jefferson Chemical Company, Inc., Houston, Tex., a corporation of Delaware
Filed Sept. 30, 1959, Ser. No. 843,548
3 Claims. (Cl. 260—634)

The present invention relates to a chlorohydrination method and, in particular, to a method for preparing butadiene dichlorohydrins from butadiene.

The reaction of hypochlorous acid with an olefin to produce an olefin chlorohydrin is well known. This process is usually conducted by admixing chlorine, water and an olefin in a suitable reaction vessel wherein the chlorine and water react to form hypochlorous acid and the latter reacts with the olefin to form an olefin chlorohydrin.

Chlorine and water may be first reacted in a separate step to form hypochlorous acid to avoid undesirable side reactions which occur in the presence of an olefin. A relatively low proportion of hypochlorous acid is produced by this method of operation, however, with the result that the reaction product obtained following reaction with the olefin is relatively low in olefin chlorohydrin content. Recovery of olefin chlorohydrin under there conditions is difficult and economically unattractive. The reaction product may, however, be recycled a number of times until the olefin chlorohydrin content of the reaction product has been enriched to a point where its recovery is practical. The need for a substantial amount of recycling is a serious drawback to this process.

In an attempt to overcome the disadvantages of the foregoing method of operation, adjacent streams of chlorine and an olefin, in the vapor phase, have been continuously passed into the lower portion of a vertical reaction tower containing water to effect the desired reactions. This method is commonly employed and has been satisfactory for the production of olefin monochlohydrins.

Butadiene has also been reacted in a manner similar to the above noted method to produce butadiene dichlorohydrins. While the desired reactions take place, a large amount of undesired by-products, such as trichlorobutanols, tetrachlorobutanes and dichlorobutenes, are produced. These difficulties are believed to be due to the highly unsaturated nature of butadiene and to the coalescence of substantial amounts of gaseous butadiene and chlorine leading to undesirable chloride substitution products. The amount of by-products formation renders this process commercially unattractive.

A method has now been discovered whereby chlorine and butadiene may be reacted in an aqueous medium in an improvement of the latter process to produce a relatively high yield of butadiene dichlorohydrins.

A particular feature of the instant process for the production of a high yield of butadiene dichlorohydrins concerns the manner in which the reactants are contacted with one another. It has been a general practice to conduct chlorohydrination reactions in a reaction tower in which the several reactants, water, olefin and chlorine, are continuously admitted through relatively proximate inlets at the bottom of the reactor and caused to react while flowing upwardly therethrough. In accordance with this invention, and in contrast to former methods, chlorine and water are continuously introduced into the bottom or lowermost zone of a reaction tower to initiate the reaction for the formation of hypochlorous acid and to finely disperse the vaporous chlorine throughout the aqueous reaction medium. Butadiene, meanwhile, is introduced into the tower in an intermediate zone or a point substantially above the point at which the chlorine is introduced.

The design of the reactor is not considered critical in this process. It is esesntial, however, that the chlorine be introduced into the reactor at a point or zone substantially below the point or zone at which the butadiene is introduced. The chlorine should be admitted through a suitable dispersion device so that the chlorine is finely dispersed in the aqueous medium. The purpose of this method of operation is to minimize or substantially avoid coalescence of the chlorine and butadiene vapors which is believed to be the cause of significant by-product formation when butadiene was employed in former methods.

This reaction is preferably effected in an elongated vertical vessel or reaction tower. Chlorine and butadiene are introduced at separate points or in separate zones, as noted above, into a stream of water flowing upwardly through the reaction vessel. Diffusion thimbles or equivalent devices are employed to effectively distribute the gaseous reactants in the aqueous medium. A relatively pure stream of the chlorine gas is employed without dilution. While the butadiene may also be employed without dilution, it has been found advantageous to dilute the butadiene with an inert gas to further promote the distribution of this reactant. For this purpose, hydrocarbons, such as methane, ethane or other lower aliphatic hydrocarbons, have been employed. The diluted butadiene stream will ordinarily consist of about 30 to 50 percent by weight of butadiene with the balance consisting of the inert hydrocarbon diluent.

As indicated above, the butadiene must be added at a point or zone in the reaction vessel that is substantially above the point or zone in which the chlorine is introduced. This point must be at least 2 to 3 feet above the point at which the chlorine is introduced and may be as much as 8 feet or more above such point as governed by economic considerations. It is preferred to introduce the butadiene at distances ranging from about 5 to 8 feet above the chlorine feed. In a reactor having a diameter of four inches, optimum conversion may be realized when the butadiene is introduced at a point about five feet above the point of the chlorine feed. It will be appreciated that the reaction vessel extends substantially above the point at which the butadiene is introduced. While this distance is not critical it should be a distance of at least 3 to 10 feet or more.

This reaction is conducted at a moderate temperature under atmospheric pressure. Temperatures ordinarily employed range from about 0° to about 95° C. with the range from about 60° to 85° C. being preferred.

Control of the proportions of reactants employed is also important for a high yield of butadiene dichlorohydrins. Theoretically, two mols of chlorine will form two mols of hypochlorous acid which will react with a mol of butadiene to form a mol of butadiene dichlorohydrin. It has been found, however, that the best yields of butadiene dichlorohydrins and minimum amounts of by-products are produced when less than the theoretical amount of chlorine is employed. Proportions of reactants found most satisfactory range from about 1 up to 1.9 mols of chlorine for each mol of butadiene although higher proportions approaching but always less than 2:1 may be employed if the feed streams are carefully controlled.

The accompanying drawing shows a form of apparatus suitable for practicing the process of this invention. In the drawing:

A diagrammatic vertical sectional view of a reaction tower is shown.

Referring to the drawing, numeral 10 indicates a reactor which is desirably in the form of an elongated cylindrical vessel. The reactor may be provided with heat exchanging means not illustrated in the drawing. The reactor has in its base a water inlet line 11 and adjacent thereto a chlorine inlet line 12. Chlorine line 12 is provided with a series of diffusion thimbles 13 for distributing the chlorine in the aqueous medium 14 entering at the bottom of the reactor. Line 15 is the butadiene inlet line which extends into the water-chlorine mixture at about the mid-point or intermediate zone of the reactor. Line 15 is also provided with diffusion thimbles 16 to effectively distribute the butadiene feed throughout the aqueous reaction medium. As indicated in the drawing, the zone in the reactor in which the butadiene feed is introduced is spaced substantially above the zone in which the chlorine feed enters the reactor.

Reactor 10 is provided with an overflow or discharge line 21 through which the reaction product containing the butadiene dichlorohydrins is taken off. With respect to the recovery of the butadiene dichlorohydrins, it is desirable to first pass the reaction product into a decanter or trap, not illustrated to remove insoluble chlorinated by-products and then to pass the so-treated reaction product into an extractor where it is contacted with an extraction solvent for removal of the butadiene chlorohydrins from the aqueous reaction product.

Reactor 10 is also provided with a water inlet line 17 and an overhead conduit 20. Line 17 is provided with diffusion thimbles at 19. Space 18, which is disposed below the water inlet and diffusion thimbles 19, is a scrubbing zone wherein any reactants or products arising from the aqueous reaction mixture are recovered in a finely divided spray of water and returned to the aqueous reaction medium. Line 20 is an outlet for the inert gases and undesirable by-products produced in the process.

In operation, water is introduced into the lowermost zone of the reactor through line 11 completely filling the reactor to the level of overflow line 21 in an upper zone of the reactor. The temperature of the water in the reactor is brought to the desired operating temperature with the aid of a suitable heat exchanging means not illustrated. The chlorine feed and the dilute butadiene feed are then metered in through lines 12 and 15 respectively in the ratios noted above.

The final reaction product containing a yield of about 90 percent of butadiene dichlorohydrins (based on charged chlorine) in an aqueous admixture is taken off overhead, treated in a decanter to remove insoluble chloride by-products and passed into a suitable extraction vessel. An extraction solvent is introduced into the extraction vessel and the mixture thoroughly admixed to effect a transfer of the butadiene dichlorohydrins from the aqueous phase into the extraction solvent or extract phase. Solvents found to be suitable for separating butadiene dichlorohydrins from an aqueous medium include the carbonyl compounds, particularly the ketones, chlorinated hydrocarbons and ethers. Ethyl ether and methyl isobutyl ketone were employed with very satisfactory results. The extract phase from the extraction step is subjected to distillation under reduced pressures to distill off the extraction solvent thereby effecting recovery of the butadiene dichlorohydrins. The following examples illustrate the practice of this invention.

*Example I*

This run was conducted in an upright reaction tower having a length of 170 cm. (67 inches) and an inside diameter of 35 mm. (1.4 inches). The reactor was equipped with a water jacket to control the reaction temperature. Chlorine and water were passed into the base of the reactor into a first zone and butadiene introduced through a diffusion disk at an intermediate point in the reactor 30 inches above the point of the chlorine feed. The flows were concurrent upwardly through the reactor. The water was metered at 12–12.3 ml./min., chlorine at 37.5–38 grams per hour and butadiene at 2 mols per hour.

The reaction was conducted at 8–10° C. until a total of 0.85 mol of chlorine had been passed into the tower.

On completion of the run, 0.355 mol of butadiene dichlorohydrin were obtained with 0.13 mol of butadiene monochlorohydrins, 0.87 mol of hydrochloric acid and a maximum of 0.03 mol of chlorine in insoluble oils, calculating the insoluble oil as tetrachlorobutane. The yield of butadiene dichlorohydrins was 84% based on the chlorine consumed. A major proportion of the balance of the hypochlorous acid formed from the chlorine and water was converted to butadiene monochlorohydrin.

In a similar reaction except that the butadiene was also introduced in the first reaction zone at the base of the reactor through a diffusion disk adjacent to the water and chlorine inlets the rate of flow and the temperature being the same as above, 2.39 mols of chlorine were consumed to form 173 grams of insoluble oils, 1.04 mols of hydrochloric acid and 0.57 mol of butadiene chlorohydrins. The yield of butadiene chlorohydrins calculated as butadiene dichlorohydrins in this case amounted to 48% based on the chlorine consumed.

*Example II*

This run was conducted in the same manner in an apparatus similar to that employed in Example I in which the butadiene was introduced in a second reaction zone at about the mid-point of the reactor. In this case, however, the butadiene feed was diluted with methane. The reactor was maintained at a temperature of 74–75.5° C. while chlorine was introduced at a rate of 1.14 mols per hour and butadiene at a rate of 0.704 mol per hour. The reaction conditions were stabilized during a pre-run period of about 2 hours and the products collected during an on-stream period of 3.9 hours. A total of 3.14 mols of butadiene chlorohydrins were produced.

*Example III*

This run was conducted in the same way as the run in Example II above. The reactor was maintained at a temperature of 19–20°. The feed rate of chlorine was 0.436 mol per hour and the feed rate of butadiene was 1.025 mols per hour. After a 4½ hour pre-run to stabilize the reaction conditions, the products of an on-stream period of 1.75 hours were collected. 1.08 mols of butadient dichlorohydrins were produced in this run amounting to a yield of butadiene dichlorohydrins of 77.7%.

A salt-saturated fraction of the aqueous reaction product such as produced above containing 58.6 grams of butadiene dichlorohydrins was treated to effect a separation of the butadiene dichlorohydrins. This fraction was introduced into an extractor with ethyl ether as the extraction solvent. A total of 2.2 liters of the ether were employed resulting in a separation of 87% of the butadiene dichlorohydrins in the extract phase. The ether extract was dried over calcium chloride and the ether removed by distillation at reduced pressure thereby effecting recovery of the butadiene dichlorohydrins product.

In a similar fashion, methyl isobutyl ketone was employed to extract the butadiene dichlorohydrins from an aqueous reaction product. This solvent resulted in an 85% extraction of butadiene dichlorohydrins. When the same solvent was employed and a salt-saturated solution treated, a 92% extraction was effected. Isophorone was employed to extract butadiene dichlorohydrins from an aqueous reaction product resulting in a 93% extraction of the dichlorohydrins. Benzene was also employed as an extraction solvent but this solvent was totally ineffective for extracting the dichlorohydrins.

Obviously many modifications and variations of the invention as hereinbefore set forth, may be made without departing from the spirit and scope thereof, and therefore, only such limitations should be imposed as are indicated in the appended claims.

I claim:

1. A method for preparing butadiene dichlorohydrins which comprises continuously feeding chlorine and water into the lowermost zone of an elongated vertical reaction vessel to form a reaction mixture, maintaining said mixture at a temperature in the range of 0° to about 95° C., continuously feeding butadiene into said reaction mixture in a zone at least 2 feet up to about 8 feet above the zone of said chlorine feed, the mol ratio of said chlorine to said butadiene being in the range from about 1:1 to less than 2:1 and withdrawing a reaction product comprising butadiene dichlorohydrins from an upper zone of said vessel.

2. A method for preparing butadiene dichlorohydrins which comprises continuously feeding water and a finely dispersed stream of chlorine into the lowermost zone of an elongated vertical reaction vessel to form a reaction mixture maintaining said mixture at a temperature in the range of 60° C. to about 85° C., continuously feeding butadiene into said reaction mixture in a zone in the range of 5 to 8 feet above the zone in which said chlorine is introduced, the mol ratio of said chlorine to said butadiene being in the range from about 1:1 to about 1.9:1, withdrawing an aqueous reaction product comprising butadiene dichlorohydrins from an upper zone of said vessel and recovering a reaction product comprising butadiene dichlorohydrins from said reaction product.

3. In a process for the preparation of butadiene dichlorohydrins wherein chlorine, water and butadiene are continuously introduced into a vertical, elongated reaction vessel to form an upwardly flowing reaction mixture, said mixture being maintained at a temperature in the range of 0° C. to about 95° C., the improvement which comprises introducing water and a finely dispersed stream of chlorine into a lowermost zone in said vessel, introducing butadiene into a zone in the range of 5 to 8 feet above the zone in which said chlorine is introduced, the mol ratio of said chlorine to said butadiene being in the range of 1:1 to about 1.9:1, and recovering a reaction product comprising butadiene dichlorohydrins from an upper zone in said vessel.

References Cited in the file of this patent

UNITED STATES PATENTS

| | | |
|---|---|---|
| 2,102,042 | Spence | Dec. 14, 1937 |
| 2,260,547 | Valik | Oct. 28, 1941 |
| 2,902,519 | Cosby et al. | Sept. 1, 1959 |

FOREIGN PATENTS

| | | |
|---|---|---|
| 564,090 | Great Britain | Sept. 13, 1944 |
| 1,063,140 | Germany | Aug. 13, 1959 |